April 6, 1954  P. T. FAXÉN  2,674,502
ANTIFRICTION BEARING FOR INSTRUMENT SHAFTS
Filed Jan. 26, 1953
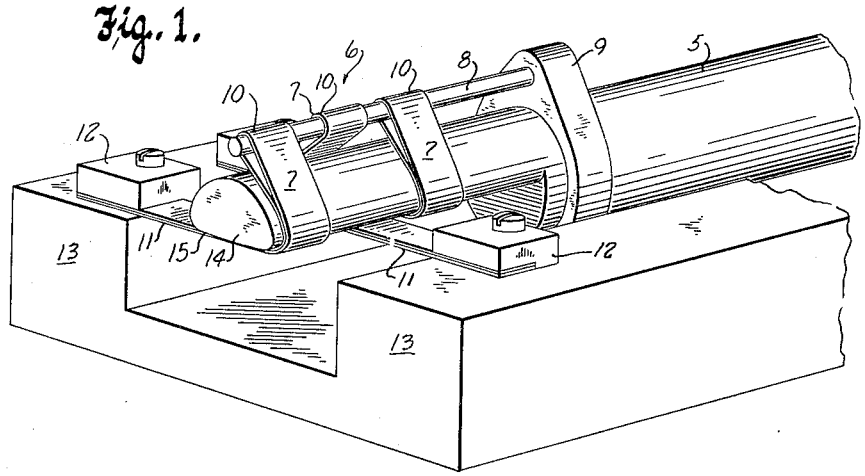
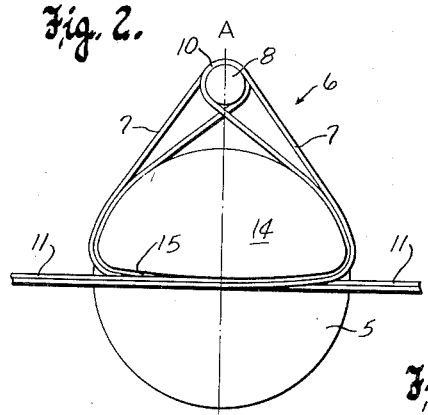
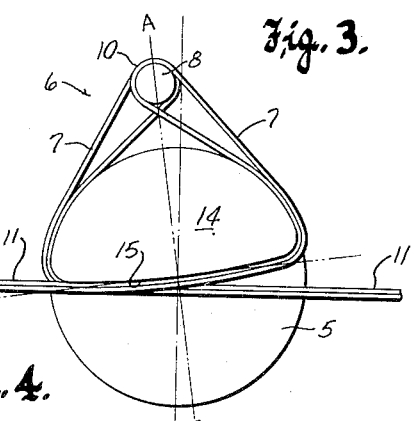
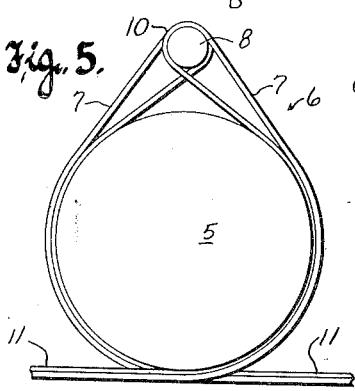
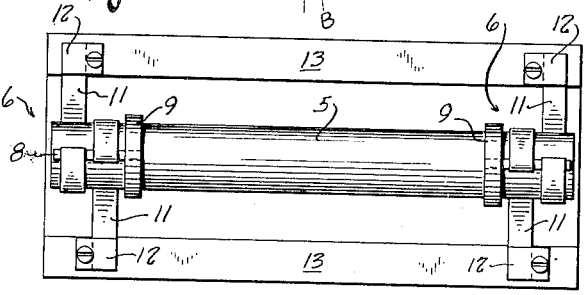
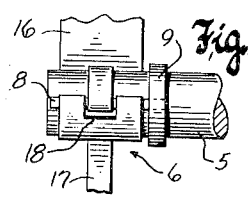
Inventor
Per Torsten Faxén Patented Apr. 6, 1954

2,674,502

UNITED STATES PATENT OFFICE 2,674,502

ANTIFRICTION BEARING FOR INSTRUMENT SHAFTS

Per Torsten Faxén, Jonkoping, Sweden

Application January 26, 1953, Serial No. 333,309

7 Claims. (Cl. 308—2)

This invention relates to bearings for shafts and refers more particularly to the mounting of shafts which require but a few degrees of rotation but wherein the support for the shaft must be as frictionless and free as can possibly be had. Such shaft mountings find great utility in precision measuring instruments.

Conventional forms of shaft bearings are generally unsatisfactory for such service. The ordinary sleeve type bearings have entirely too much friction; jewel bearings such as those used in watches though quite frictionless are objectionable because of their sensitivity to end thrust; and ball bearings are affected by dust and dirt which inevitably gathers therein during use.

This invention, therefore, has as its purpose and object to provide an antifriction bearing especially adapted for mounting a shaft for limited rotation which is insensitive to end thrust and which is so designed and constructed as to be practically frictionless despite the presence of dirt and dust which may accumulate therein.

Another object of this invention is to provide a shaft bearing which will achieve this very desirable result and still not require a high degree of accuracy in its construction.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates several complete examples of the physical embodiments of the invention constructed according to the best modes so far devised for the practical application of the principles thereof, and in which:

Figure 1 is a perspective view of a bearing embodying this invention;

Figure 2 is an end view of the shaft and the main elements of its mounting, said view showing the shaft in a position of rotation midway between the limits thereof;

Figure 3 is a view similar to Figure 2 but illustrating the shaft rotated in one direction from its position shown in Figure 2;

Figure 4 is a top plan view illustrating the manner in which two bearing units are employed to mount a shaft which is longer than can be satisfactorily supported by one bearing unit;

Figure 5 is a view similar to Figure 2 but illustrating a slightly modified embodiment of the invention; and Figure 6 is a fragmentary top plan view of a shaft bearing embodying this invention in still another modified form.

Referring now particularly to the accompanying drawing, the numeral 5 designates the shaft to be mounted for rotation or oscillation through a limited range. Where the shaft is short one bearing unit, indicated generally by the numeral 6, may be sufficient to support the shaft as in Figure 1, but where the shaft is longer two such bearing units are employed as shown, for instance, in Figure 4. In each instance the principal and general construction of the bearing unit is the same.

The main elements of the bearing are a plurality of flexible tension members 7 medially looped about a rod-like anchor member 8 which is fixedly mounted upon the shaft 5, preferably in spaced parallel relation to the peripheral surface thereof. Any suitable means for mounting the anchor member 8 may be employed as for instance an arm 9 projecting radially from the shaft and to which the rod-like anchor member is secured.

The tension members 7 are preferably flat metal bands and in view of their function may be called suspension bands. They are medially looped about the anchor member as at 10 and wrapped about opposite sides of the shaft to extend in opposite directions tangentially from the surface of the shaft remote from the anchor member. The overlying extended end portions 11 lie in a common plane and are firmly anchored as at 12 to suitable supports 13, which in the embodiment illustrated in Figure 1 are spaced apart bosses on a mounting base or frame.

Where only one bearing unit is needed to support the shaft three suspension bands spaced axially along the length of the shaft, as shown in Figure 1, will generally suffice. In this case the extended end portion 11 of one of the bands projects in one direction to be anchored to one of the supports 13 and the extended end portions of the other two bands project in the opposite direction to be anchored to the other support. The anchorage for the extended end portions of the suspension bands should be such as to maintain the bands in tension so that their extended end portions lie in a common plane.

For longer shafts it is preferable to provide a bearing unit at each end of the shaft as shown in Figure 4, and in this case each bearing unit need consist of only two suspension bands having their extended end portions projecting in opposite directions.

In either case the shaft is free to turn through a limited arc without any opposition whatever from the bearing structure by which it is supported.

As the shaft turns, some lateral displacement thereof will be inevitable if the construction shown in Figure 5 is used, since in this instance the shaft rolls along the plane of the extended end portions 11 of the suspension bands, but there will be no vertical displacement of the shaft.

At the expense of a slight increment of vertical displacement this horizontal or lateral motion of the shaft can be materially reduced through use of the construction shown in Figures 1, 2 and 3, for in this case the point of tangency between the shaft and the extended end portions of the suspension bands in the normal position of the shaft is close to its axis. To achieve this result the mounted end portion of the shaft has one side thereof cut away to leave a substantially semi-cylindrical portion 14 which provides a rolling surface 15 closely adjacent to the shaft axis. The rolling surface 15 is slightly arcuate and symmetrical about a longitudinal plane A—B which contains the axes of the shaft 5 and the rod-like anchor member 8.

The curvature of the rolling surface 15 is defined by an arc having a radius much greater than that of the shaft and struck from an axis lying on the plane A—B but at a considerable distance beyond the axis of the anchor member. Hence, the surface 15 approaches flatness; but at its opposite sides it merges into the peripheral surface of the shaft with a relatively large radius so as to preclude objectionably sharp bending of the suspension bands.

From a comparison of Figures 2 and 3, it will be seen that the lateral and vertical displacement of the shaft during rotation thereof is reduced to a minimum.

While the tension members preferably consist of flat metal bands of the same width so that all of the bands have the same tensile strength, a possible alternative of this arrangement is illustrated in Figure 6. In this case a balanced mounting for the shaft is obtained by providing a wide suspension band 16 and a narrow band 17, the extended portions of which project in opposite directions. The wide band has its medial portion which is looped around the anchor member cut away as at 18 to expose the anchor member and accommodate the looped medial portion of the narrow band. In other respects the construction shown in Figure 6 follows that described.

From the foregoing description taken in connection with the accompanying drawing, it will be readily apparent to those skilled in this art that this invention provides an antifriction bearing especially well adapted to the mounting of shafts requiring but a few degrees of rotation and that the frictionless attributes of the bearing are not affected by possible accumulations of dirt and dust notwithstanding long periods of service, and also that the construction of the bearing does not call for an exceptionally high degree of accuracy.

What I claim as my invention is:

1. An antifriction bearing for mounting a shaft for limited rotation, comprising: a rod-like anchor member fixed to the shaft in parallel spaced relation to the shaft axis and to the adjacent outer surface of the shaft; a plurality of flexible tension members each medially looped about said anchor member, one of said hooped flexible tension members having its end portions wrapped about one side of the shaft and extended tangentially in the opposite direction from the outer surface of the shaft remote from the anchor member; another tension member having its end portions wrapped about the other side of the shaft and extended tangentially from the outer surface of the shaft remote from the anchor member in the opposite direction; a fixed support for each of the oppositely extending end portions of the tension members; and means securing said end portions of the tension members to said supports.

2. An antifriction bearing for mounting a shaft for limited rotation, comprising: a rod-like anchor member fixed to the shaft in parallel spaced relation to the shaft axis and to the adjacent outer surface of the shaft; at least three suspension bands each looped about the rod-like anchor member, at least one of said suspension bands extending laterally in one direction from the rod-like anchor member and being wrapped about the adjacent side of the shaft to extend tangentially from the surface of the shaft remote from the anchor member; at least two of said suspension bands extending laterally in the opposite direction from said rod-like anchor member and being wrapped about the adjacent side of the shaft to extend tangentially from the surface of the shaft remote from the anchor member; and means firmly anchoring the thus extended ends of all of said suspension bands with their extended end portions lying in a common plane.

3. An antifriction bearing for mounting a shaft for limited rotation, compriisng: a shaft having a generally semi-cylindrical portion providing a rolling surface closely adjacent to the axis of the shaft and symmetrical to a plane which includes the shaft axis and longitudinally bisects the semi-cylindrical portion; a rod-like anchor member smaller than the shaft; means rigidly mounting said rod-like anchor member upon the shaft with said rod-like anchor member lying in the said plane and spaced outwardly from the adjacent peripheral surface of the shaft; a plurality of flexible tension members each looped about the rod-like anchor member, one of said tension members extending laterally in one direction from the anchor member and being wrapped around the adjacent side of the semi-cylindrical shaft portion and back across the rolling surface thereof to extend tangentially from said rolling surface in one direction; another tension member extending laterally in the other direction from the rod-like anchor member and being wrapped around the adjacent side of the semi-cylindrical shaft portion and back across the rolling surface to extend tangentially therefrom in the opposite direction; spaced apart supports for the tangentially extended end portions of the tension members; and means securing said extended end portions to said supports with the tension members in tension and their extended end portions lying in a common plane.

4. The bearing set forth in claim 3 further characterized by the fact that the rolling surface is convex.

5. The bearing set forth in claim 3 further characterized by the fact that the flexible tension members are in the form of flat bands each medially looped about the anchor member with its end portions in overlying relationship.

6. The bearing set forth in claim 3 further characterized by the fact that there are at least three tension members and that the extended end portions of at least one of them projects tangentially from the rolling surface in one direction while the extended end portions of at least two other tension members project tangentially from the rolling surface in the opposite direction.

7. The bearing set forth in claim 5 further characterized by the fact that the medially looped portion of one of said tension members is medially cut away to expose the rod-like anchor member, and by the fact that the medial portion of another tension member is looped about the thus exposed portion of the anchor member.

References Cited in the file of this patent

UNITED STATES PATENTS

| Number | Name | Date |
|---|---|---|
| 2,213,323 | Nesbitt et al. | Sept. 3, 1940 |
| 2,527,898 | Townshend | Oct. 31, 1950 |